(No Model.)
J. M. KRUZAN.
SLED BRAKE.
No. 599,566. Patented Feb. 22, 1898.
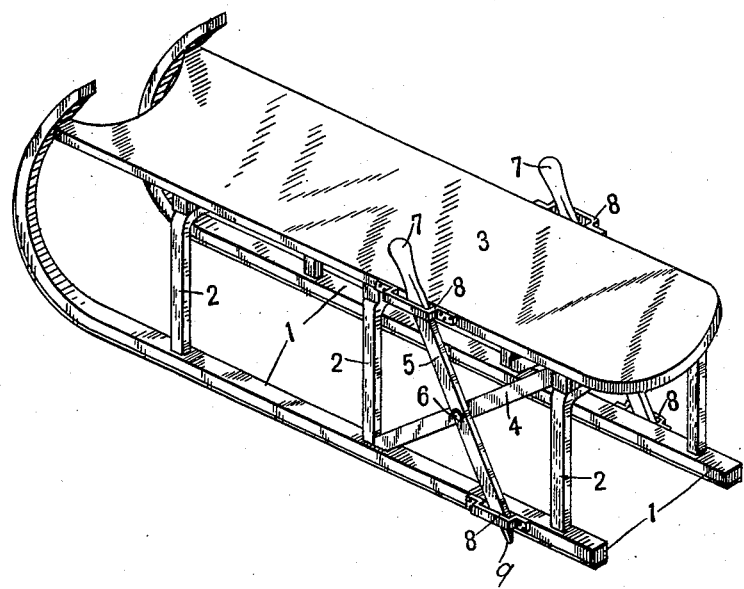
WITNESSES.
Frank O. Wheeler
Frank Avery
INVENTOR.
James M. Kruzan,
By N. Roscoe Wheeler
Attorney.

UNITED STATES PATENT OFFICE.

JAMES M. KRUZAN, OF PRAIRIETON, INDIANA.

SLED-BRAKE.

SPECIFICATION forming part of Letters Patent No. 599,566, dated February 22, 1898.

Application filed May 17, 1897. Serial No. 636,831. (No model.)

*To all whom it may concern:*

Be it known that I, JAMES M. KRUZAN, a citizen of the United States, residing at Prairieton, in the county of Vigo and State of Indiana, have invented certain new and useful Improvements in a Combined Sled Brake and Steering Apparatus; and I do hereby declare the following to be a full, clear, and exact description of the invention, such as will enable others skilled in the art to which it appertains to make and use the same, reference being had to the accompanying drawing, forming a part of this specification.

This invention relates to new and useful improvements in sled brakes and steering apparatus; and it consists in the construction and arrangement of parts, as hereinafter fully set forth, and pointed out particularly in the claim.

The object of the invention is to provide a sled of an ordinary pattern with levers at the sides thereof by the operation of which the speed of said sled may be checked or the direction thereof minutely controlled, which object is attained by the construction illustrated in the accompanying drawing, in which the figure is a general perspective view of a sled provided with my improved brake and steering-levers.

In the drawing, 1 designates the sled-runners, 2 the yoke-braces, forming a portion of the framework, and 3 the sled-top.

4 represents one of two brace-bars which are arranged diagonally between the rear yoke-braces of the sled.

5 indicates the operating-levers, which are pivoted at 6 to said diagonal brace-bar 4, the upper ends of said levers terminating in handles 7 and their lower ends being provided with spurs 9.

8 represents clips, one pair of which are fastened to the sides of the top and another pair secured to the sides of the runners, said clips serving as protectors for said operating-levers and to limit their movement.

The operation of the apparatus is as follows: When it is desired to check the speed of the sled, as in "coasting," both of the handles 7 are evenly drawn upon, which causes the spurs at their lower extremities to be depressed below the bearing-face of the runners, and by reason of the weight upon the sled they are caused to cut into the snow or ice over which the sled may be running. Should it be desired to steer the sled to the right, the right-hand handles would be drawn backward, causing only one spur to be depressed and thus forming a pivot around which the sled under motion would have a tendency to turn. Should it be desired to turn the sled to the left, the left-hand lever would be operated in the same manner as that described for the right-hand lever.

It will thus be seen that this construction and arrangement of parts produce a combination brake and steering apparatus for sleds that may be cheaply manufactured, one that may be easily applied to the sled as commonly made, and one by the use of which the direction of the sled may be positively controlled without dragging the feet or hands in the snow or upon the track.

Having thus fully set forth my invention, what I claim as new, and desire to secure by Letters Patent, is—

In a sled brake and steering apparatus, the combination with a sled having the runners 1; yoke-braces 2 forming a portion of the framework; the sled-top 3; brace-bars 4 arranged diagonally between the rear yoke-braces of said sled; operating-levers 5 pivoted to said diagonal brace-bars 4 at 6, the upper ends of said levers terminating in handles 7; spurs 8 provided at the lower ends of said levers; and clips 9 fastened to the sides of said top and said runners, said clips adapted to serve as protectors for said operating-levers and to limit their movement, substantially as described.

In testimony whereof I affix my signature in presence of two witnesses.

JAMES M. KRUZAN.

Witnesses:
FRANCIS D. CREWS,
WILLIAM H. KRUZAN.